(12) United States Patent
Eloy et al.

(10) Patent No.: US 11,345,334 B2
(45) Date of Patent: May 31, 2022

(54) METHOD FOR DETECTING COMBUSTION IRREGULARITIES OF AN INTERNAL COMBUSTION ENGINE UNIT COUPLED TO AN ELECTRIC PROPULSION UNIT, OF A HYBRID MOTOR VEHICLE

(71) Applicants: Continental Automotive France, Toulouse (FR); Continental Automotive GmbH, Hannover (DE)

(72) Inventors: Stéphane Eloy, Tournefeuille (FR); Nathalie Raud, Plaisance du Touch (FR)

(73) Assignees: Continental Automotive France; Continental Automotive GmbH

( * ) Notice: Subject to any disclaimer, the term of this patent is extended or adjusted under 35 U.S.C. 154(b) by 486 days.

(21) Appl. No.: 16/310,193

(22) PCT Filed: Jun. 16, 2017

(86) PCT No.: PCT/FR2017/051574
§ 371 (c)(1),
(2) Date: Dec. 14, 2018

(87) PCT Pub. No.: WO2017/216497
PCT Pub. Date: Dec. 21, 2017

(65) Prior Publication Data
US 2019/0256082 A1    Aug. 22, 2019

(30) Foreign Application Priority Data
Jun. 17, 2016   (FR) ...................................... 1655662

(51) Int. Cl.
*B60W 20/50*     (2016.01)
*B60W 20/10*     (2016.01)
(Continued)

(52) U.S. Cl.
CPC ............. *B60W 20/50* (2013.01); *B60K 6/485* (2013.01); *B60W 10/06* (2013.01); *B60W 10/08* (2013.01);
(Continued)

(58) Field of Classification Search
CPC ....... Y02T 10/62; B60W 10/08; B60W 10/06; B60W 20/10; B60W 20/16; B60W 20/50;
(Continued)

(56) References Cited

U.S. PATENT DOCUMENTS 7,775,089 B2 * 8/2010 Suzuki ................ G01M 15/042
73/114.15
7,823,668 B2   11/2010 Ogata et al.
(Continued)

FOREIGN PATENT DOCUMENTS

CN   101045454 A   10/2007
CN   102470858 A    5/2012
(Continued)

OTHER PUBLICATIONS

International Search Report and Written Opinion for International Application No. PCT/FR2017/051574, dated Sep. 13, 2017—8 pages.
(Continued)

*Primary Examiner* — Peter D Nolan
*Assistant Examiner* — Demetra R Smith-Stewart
(74) *Attorney, Agent, or Firm* — RatnerPrestia

(57) ABSTRACT

A method for detecting combustion irregularities in an internal combustion engine unit coupled to an electric propulsion unit of a hybrid motor vehicle having a management unit, consisting in intermittently measuring a pair of values P, θ that are respectively representative of the value P of the power consumed by the electric engine and of the value θ of the speed of the combustion engine, in comparing each pair
(Continued)

of measured values P, θ with a pair of theoretical values Pth, θth corresponding to the setpoint data delivered by the management unit, and, when there is a lack of correspondence between at least one of the measured values P, θ and the associated theoretical value Pth, θth, triggering a synchronization procedure intended to determine the phasing of the internal combustion engine.

17 Claims, 2 Drawing Sheets

(51) Int. Cl.
  *B60W 10/06* (2006.01)
  *B60W 10/08* (2006.01)
  *B60W 20/16* (2016.01)
  *B60K 6/485* (2007.10)
(52) U.S. Cl.
  CPC ............ *B60W 20/10* (2013.01); *B60W 20/16* (2016.01); *B60W 2510/068* (2013.01); *B60W 2510/0638* (2013.01); *B60W 2710/0644* (2013.01); *B60W 2710/0677* (2013.01); *B60W 2710/083* (2013.01); *B60W 2710/086* (2013.01); *B60Y 2200/92* (2013.01); *Y02T 10/62* (2013.01)
(58) Field of Classification Search
  CPC ... B60W 2510/0638; B60W 2510/068; B60W 2710/086; B60W 2710/083; B60W 2710/0677; B60W 2710/0644; B60W 2200/92; B60K 6/485
  See application file for complete search history.

(56) References Cited

U.S. PATENT DOCUMENTS

| | | | |
|---|---|---|---|
| 2001/0009147 A1 | 7/2001 | Takashima et al. | |
| 2007/0006831 A1* | 1/2007 | Leone | F01L 13/0015 123/90.15 |
| 2007/0209619 A1* | 9/2007 | Leone | F02D 41/042 123/90.12 |
| 2009/0025467 A1* | 1/2009 | Suzuki | G01M 15/042 73/114.15 |
| 2010/0038159 A1* | 2/2010 | Jinno | B60K 6/448 180/65.265 |
| 2010/0081539 A1* | 4/2010 | Endo | B60L 7/24 477/3 |
| 2010/0274421 A1* | 10/2010 | Falkenstein | B60L 50/16 701/22 |
| 2011/0072893 A1* | 3/2011 | Malaczynski | G01M 15/11 73/114.03 |
| 2012/0041630 A1* | 2/2012 | Yamamoto | B60W 20/40 701/22 |
| 2012/0203411 A1 | 8/2012 | Mallebrein et al. | |
| 2013/0296110 A1* | 11/2013 | Shelton | B60W 20/40 180/65.265 |
| 2014/0136078 A1 | 5/2014 | Baumann et al. | |
| 2015/0109021 A1* | 4/2015 | Gomez | G05B 23/0259 324/764.01 |
| 2015/0183425 A1 | 7/2015 | Choi et al. | |
| 2017/0082039 A1* | 3/2017 | Sugimoto | B60W 10/08 |

FOREIGN PATENT DOCUMENTS

| | | |
|---|---|---|
| DE | 102006012858 A1 | 9/2007 |
| DE | 102007043607 A1 | 3/2009 |
| DE | 102011078930 A1 | 1/2013 |
| EP | 1143134 A1 | 10/2001 |
| JP | 2010215183 A | 9/2010 |
| KR | 20140092133 A | 7/2014 |
| WO | 2008149209 A1 | 12/2008 |
| WO | 2012072896 A1 | 6/2012 |

OTHER PUBLICATIONS

Chinese Office Action for Chinese Application No. 201780050163.2, dated Apr. 27, 2021, with translation, 17 pages.

* cited by examiner

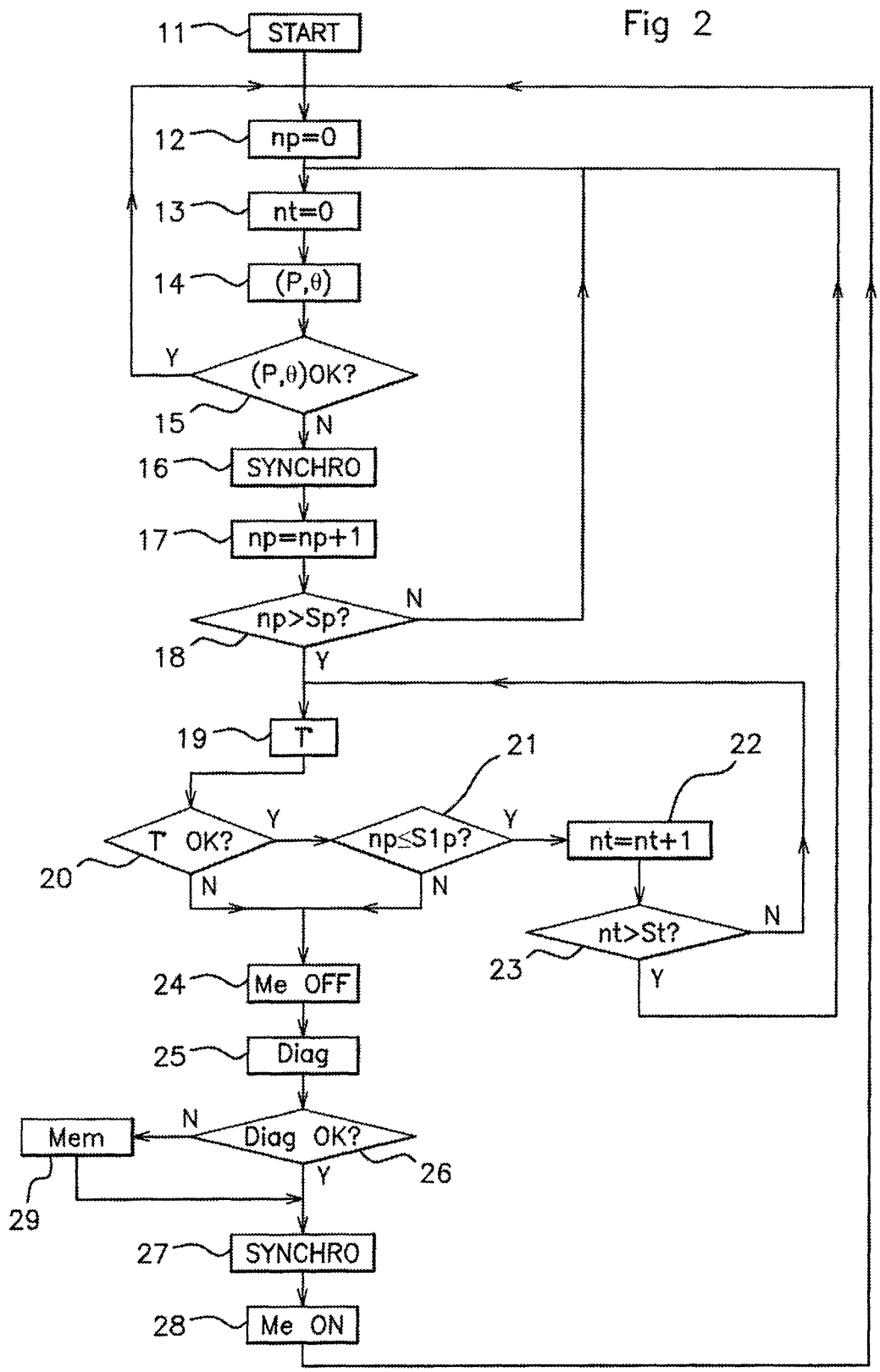

METHOD FOR DETECTING COMBUSTION IRREGULARITIES OF AN INTERNAL COMBUSTION ENGINE UNIT COUPLED TO AN ELECTRIC PROPULSION UNIT, OF A HYBRID MOTOR VEHICLE

CROSS REFERENCE TO RELATED APPLICATIONS

This application is the U.S. National Phase application of PCT International Application No. PCT/FR2017/051574, filed Jun. 16, 2017, which claims priority to French Application No. 1655662, filed Jun. 17, 2016, the contents of such applications being incorporated by reference herein.

FIELD OF THE INVENTION

The invention relates to a method for detecting combustion irregularities in an internal combustion engine unit, called a combustion engine, coupled to an electric propulsion unit, called an electric engine, of a hybrid motor vehicle having a management unit designed to determine the respective powers to be supplied by each of said combustion engine and electric engine, and to deliver to said engines setpoint data dependent on these power distributions.

BACKGROUND OF THE INVENTION

When a vehicle having a combustion engine is started, strategies are unfurled so as to determine the synchronization of this engine, that is to say so as to precisely identify the position of the moving components (pistons, crankshafts, camshafts, etc.) as well as the instant of the engine cycle (intake, compression, etc.) for the purpose of allowing the on-board electronics to manage said engine with the accuracy and precision that are required for it to operate correctly.

However, these strategies are not infallible, and the risks of confirming an engine phasing when this phasing turns out to be incorrect cannot be ruled out.

Now, an incorrect phasing constitutes a non-negligible risk of damaging the engine or the catalytic converter. Thus, by way of example:
- if this incorrect phasing leads to ordering starting in the compression phase, the engine risks being greatly damaged (excessively high pressure and temperature),
- if this incorrect phasing leads to poor combustion or lack of combustion, the presence of uncombusted hydrocarbons in the exhaust line risks greatly damaging the catalytic converter.

In the case of vehicles propelled only by a combustion engine, strategies make it possible to detect these malfunctions and to correct the phasing. Thus, by way of example, combustion misfires manifest themselves in knocks that allow them to be easily identified and corrected.

By contrast, in the case of hybrid vehicles having a combustion engine coupled to an electric engine, and whose torque is distributed between the two propulsion sources at all times, the strategies for detecting malfunctions prove ineffective, as the electric engine contributes to obtaining the total torque, and is thus able to compensate for malfunctions of the combustion engine.

SUMMARY OF THE INVENTION

An aspect of the present invention aims to mitigate these drawbacks inherent to hybrid vehicles having a combustion engine coupled to an electric engine, and its main objective is to provide a method for detecting combustion irregularities in the combustion engine of such hybrid vehicles.

To this end, an aspect of the invention targets a method for detecting combustion irregularities in a combustion engine, coupled to an electric engine, of a hybrid motor vehicle having a management unit designed to determine the respective powers to be supplied by each of said combustion engine and electric engine, and to deliver to said engines setpoint data dependent on these power distributions, said method consisting in:
- intermittently measuring a pair of values that are respectively representative, at a given instant t, of the value P of the power consumed by the electric engine and of the value $\theta$ of the speed of the combustion engine,
- comparing each pair of measured values with a pair of theoretical values that are respectively representative of the values of the power Pth consumed by the electric engine and of the speed $\theta$th of the combustion engine, corresponding to the setpoint data delivered by the management unit,
- and, when there is a lack of correspondence between at least one of the measured values P, $\theta$ and the associated theoretical value Pth, $\theta$th, triggering a procedure for synchronizing the combustion engine.

It should be noted, in the present patent application, that "power P consumed by the electric engine" is understood to mean the power calculated by way of the measured value of the level of current consumed by the electric engine and of the value of the voltage U of the electrical network supplying power to said electric engine.

The method according to an aspect of the invention therefore implements, first and foremost, a monitoring strategy consisting in comparing a pair of values resulting from measurements, called measured values, of two specific parameters P, $\theta$ and the pair of theoretical values of these two parameters Pth, $\theta$th corresponding to the setpoint data and therefore constituting the values representative of a correct phasing of the electric engine.

The method according to an aspect of the invention furthermore consists, when there is a lack of matching between at least one of the two measured values P, $\theta$ and the associated theoretical value, in performing a procedure aimed at obtaining a new synchronization status that makes it possible to mitigate poor operation of the combustion engine resulting from a phasing problem.

According to this method, and when the management unit is programmed to manage the speed of the electric engine, the comparison between the pairs of measured values P, $\theta$ and the pairs of theoretical values Pth, $\theta$th advantageously consists, according to an aspect of the invention, in checking the correspondence between the measured values P and the theoretical values Pth of the power consumed by the electric engine.

In this case, specifically, in the scenario of poor operation of the combustion engine, obtaining the setpoint engine speed requires increasing the power consumed by the electric engine: the electric engine thus has to consume a higher power P to reach the setpoint.

By contrast, according to the method of an aspect of the invention, when the management unit is programmed to manage the torque of the electric engine, the comparison between the pairs of measured values P, $\theta$ and the pairs of theoretical values Pth, $\theta$th advantageously consists in checking the correspondence between the measured values $\theta$ and the theoretical values $\theta$th of the speed of the combustion engine.

In this case, specifically, in the scenario of poor operation of the combustion engine, the setpoint engine speed may not be reached when the power consumed by the electric engine corresponds to the setpoint datum. In other words, the electric engine does not compensate for the reduction in torque produced by the combustion engine.

According to one advantageous mode of implementation of an aspect of the invention, when a determined number Sp, where Sp>1, of successive measurements of the pairs of values P, θ are subject to a lack of correspondence with the associated pairs of theoretical values Pth, θth:
- momentary stoppage of the electric engine is ordered, during which stoppage a procedure for diagnosing combustion irregularities, such as combustion misfires, is triggered,
- the cycle of intermittent measurements of the pairs of values P, θ is resumed after the electric engine is restarted.

These provisions, implemented after the implementation of (Sp+1) unsuccessful synchronization procedures relating to operating faults with the combustion engine, make it possible, following the stoppage of the electric engine, to implement conventional diagnostic procedures for detecting combustion irregularities in a combustion engine, in particular combustion misfires or partial combustions, which reveal various disorders that may affect the creation of the air/fuel mixture, the starting means, a mechanical element, etc., at the end of which the potential anomalies are memorized, and means for alerting the driver are potentially triggered.

According to another advantageous mode of implementation of an aspect of the invention aimed at a hybrid vehicle whose combustion engine is connected to an exhaust line equipped with a catalytic converter and with means for measuring the temperature T° at least one longitudinal area of said exhaust line, when a determined number Sp, where Sp>1, of successive measurements of the pairs of values P, θ are subject to a lack of correspondence with the associated pairs of theoretical values Pth, θth, the temperature T° is measured in at least one area of the exhaust line and the measured temperature T° is compared with a theoretical temperature Tth representative of certified normal operation of the combustion engine, and:
- when there is a difference greater than a predetermined threshold between the measured value T° and theoretical value Tth, momentary stoppage of the electric engine and triggering of a diagnostic procedure are ordered,
- when there is correspondence between the measured value T° and theoretical value Tth, the cycle of intermittent measurements of the pairs of values P, θ is resumed.

According to this provision, stoppage of the electric engine is ordered following (Sp+1) unsuccessful synchronization procedures when, furthermore, the monitoring of the temperatures at the exhaust confirms the conclusions of the monitoring of the pair of data P, θ.

However, advantageously according to an aspect of the invention, when a determined number S1p–Sp, where (S1p–Sp)≥1, of successive measurements of the temperature T° correspond to the theoretical temperature Tth, momentary stoppage of the electric engine and triggering of a diagnostic procedure are nevertheless ordered.

The aim of this provision, for safety purposes, is to trigger the diagnostic procedures in the scenario of persistent contrasting conclusions resulting from the procedures for monitoring the pairs of values P, θ and the temperatures at the exhaust.

According to another advantageous mode of implementation of an aspect of the invention, a delay of a duration suitable for allowing the evolution of the measured temperatures T° resulting from the synchronization procedure preceding said measurements to be taken into account is initiated.

This delay makes it possible to smooth the dynamic differences between the evolution of the temperature at the exhaust and the evolution of the pair of values P, θ.

With regard to the measurement of the temperature at the exhaust, and according to a first advantageous mode of implementation of an aspect of the invention, the temperature Tm in an area of the exhaust line situated at the output of the combustion engine is measured, which temperature proves to be lower than the theoretical temperature Tth when uncombusted hydrocarbons penetrate into the exhaust line.

According to a second advantageous mode of implementation of an aspect of the invention, the temperature Tp in an area of the exhaust line situated downstream of the catalytic converter is measured, which temperature proves to be far higher than the theoretical temperature Tth when hydrocarbons combust in the catalytic converter.

Still with regard to the measurement of the temperature at the exhaust, and according to a third advantageous mode of implementation of an aspect of the invention:
- the temperature Tm in an area of the exhaust line situated at the output of the combustion engine is measured, on the one hand, and the temperature Tp in an area of the exhaust line situated downstream of the catalytic converter is measured, on the other hand,
- the difference in the temperatures Tp–Tm is used for the purpose of comparison with corresponding theoretical values.

BRIEF DESCRIPTION OF THE DRAWINGS

Other features, aims and advantages of aspects of the invention will emerge from the following detailed description with reference to the appended drawings showing, by way of non-limiting example, one preferred mode of implementation thereof. In these drawings:

FIG. 2 shows a flow chart of an example of this detection method.

DETAILED DESCRIPTION OF THE PREFERRED EMBODIMENTS

Figure 1:
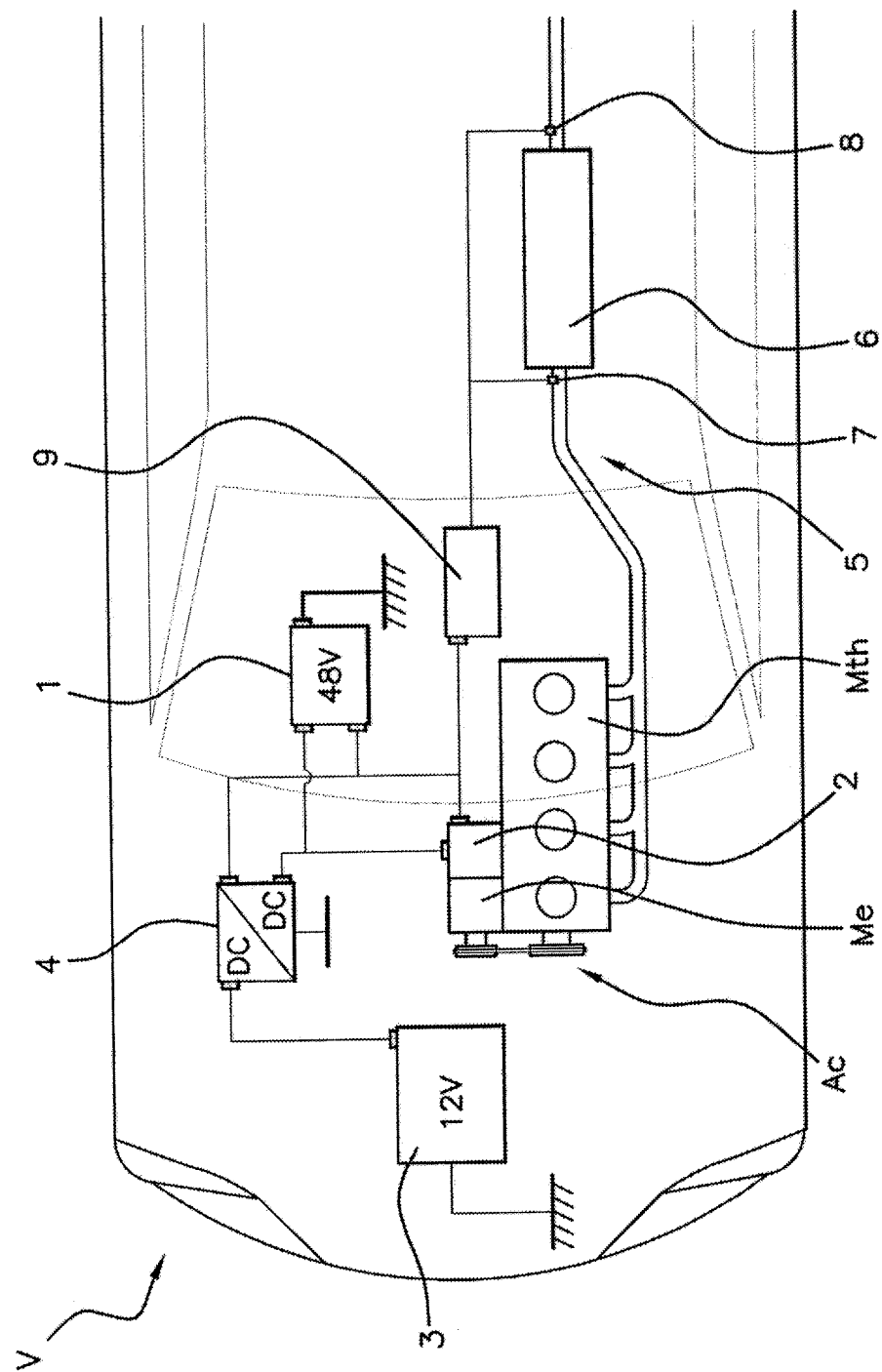
FIG. 1 is a schematic plan view of a hybrid vehicle allowing the method according to an aspect of the invention for detecting combustion irregularities in a combustion engine to be implemented.

The method according to an aspect of the invention, the flow chart of which is shown in FIG. 2, is implemented for the purpose of detecting combustion irregularities in a combustion engine Mth whose exhaust line 5 is equipped with a catalytic converter 6 and has temperature sensors 7, 8 positioned upstream and downstream, respectively, of the catalytic converter, and the combustion engine being mounted in a hybrid vehicle V shown in FIG. 1, comprising an electric engine Me coupled to the combustion engine Mth by a system Ac for transmitting the engine torque.

This hybrid vehicle V has a first DC voltage source 1 integrated into a primary circuit comprising a DC-to-DC converter 4 for supplying power to the electric engine Me.

This hybrid vehicle V also has a secondary circuit supplied by a second DC voltage source 3, connected to the primary circuit by way of the DC-to-DC voltage converter 4 supplied by the second DC voltage source 3.

As is conventional, the first voltage source 1 consists of a high-voltage battery or group of high-voltage batteries, for example a lithium-ion battery or Ni-MH battery, delivering for example a nominal voltage of 48 volts, and the second voltage source 3 consists of a low-voltage battery, such as a lead battery delivering a nominal voltage substantially equal to 12 volts.

This hybrid vehicle V lastly has control electronics or a management unit 9 designed in particular to:
- determine, at all times, the power or the torque to be supplied by the combustion engine Mth and the electric engine Me, and to deliver to said engines setpoint data dependent on these distributions,
- manage the implementation of the method according to an aspect of the invention for detecting potential combustion irregularities in the combustion engine Mth.

As shown by the flow chart of FIG. 2, this detection method begins, after step 11 of starting the vehicle V, with an initial step 12 of resetting the counter of a first incrementation variable np for the iterative loop described below of "measuring the parameters P, $\theta$".

This first iterative loop begins with step 13 of resetting the counter of a second incrementation variable nt for a second iterative loop, described further on, of "measuring the temperatures T° in the exhaust line 5".

The first iterative loop continues with a step 14 of measuring a pair (P, $\theta$) of values that are respectively representative, at a given instant t, of the value of the power P consumed by the electric engine Me and of the value $\theta$ of the speed of the combustion engine Mth.

These measured values P, $\theta$ are then compared, in following step 15, with a pair (Pth, $\theta$th) of theoretical values that are respectively representative of the values of the power Pth consumed by the electric engine Me and of the speed $\theta$th of the combustion engine Mth, corresponding to the setpoint data delivered by the management unit 9.

When the management unit 9 is programmed to manage the speed of the electric engine Me, this comparison between the pairs (P, $\theta$) of measured values and the pairs (Pth, $\theta$th) of theoretical values consists in checking the correspondence between the measured values P and the theoretical values Pth of the power consumed by the electric engine Me.

When the management unit 9 is programmed to manage the torque of the electric engine Me, this comparison between the pairs (P, $\theta$) of measured values and the pairs (Pth, $\theta$th) of theoretical values consists, by contrast, in checking the correspondence between the measured values $\theta$ and the theoretical values $\theta$th of the speed of the combustion engine Mth.

When this comparison leads to establishing correspondence between the measured values and the theoretical values, representative of a lack of combustion irregularities, the following step consists in commencing a new revolution of the iterative loop, starting upstream of initial step 12 of resetting the counter of the variable np.

By contrast, when there is a lack of correspondence between at least one of the measured values P, $\theta$ and the associated theoretical value Pth, $\theta$th, following step 16 consists in triggering a procedure for synchronizing the combustion engine Mth, consisting in updating the synchronization status.

The following steps then consist in a step 17 of incrementing the variable np by one unit, followed by the commencement of a new revolution of the iterative loop, starting downstream of initial step 12 of resetting the counter of said variable np, which therefore represents the number of synchronization procedures performed on account of measurements of incorrect pairs (P, $\theta$).

This first iterative loop ends when, after incrementation in step 17, the variable np adopts a value greater than a predetermined ceiling value Sp, established in a step 18 of comparing between the value of this variable np and said ceiling value Sp.

In practice, this first iterative loop therefore ends when a determined number Sp+1 of successive measurements of the pairs of values P, $\theta$, each followed by a synchronization procedure, have been subject to a lack of correspondence with the associated pairs of theoretical values Pth, $\theta$th.

The progress of the detection method according to an aspect of the invention continues, at the end of first iterative loop, with the implementation of a second iterative loop, beginning with a step 19 of measuring the temperature in the exhaust line 5.

Three main measurement options may be implemented for the purpose of these temperature measurements.

A first option consists in measuring the temperature Tm in an area of the exhaust line 5 situated at the output of the combustion engine Mth, upstream of the catalytic converter 6, by way of the temperature sensor 7.

A second option consists in measuring the temperature Tp in an area of the exhaust line 5 situated downstream of the catalytic converter 6, by way of the temperature sensor 8.

The third option, for its part, consists in measuring the temperature Tm in an area of the exhaust line 5 situated at the output of the combustion engine Mth, by way of the temperature sensor 7, and the temperature Tp in an area of the exhaust line 5 situated downstream of the catalytic converter 6, by way of the temperature sensor 8, and then in calculating the difference in temperatures Tp−Tm.

Regardless of the option that is chosen, following step 20 consists in comparing the measured value Tm, Tp, or Tm−Tp, with an equivalent theoretical temperature Tth representative of certified normal operation of the combustion engine Mth.

The lack of correspondence between the measured value T° and theoretical value Tth, which is reflected in a difference between these values that is greater than a predetermined threshold, ends this second iterative loop. By way of example, a difference greater than a value of the order of 60° between the measured value T° and theoretical value Tth ends this second iterative loop.

By contrast, when there is correspondence between the measured value T° and theoretical value Tth, step 21 following this comparison step 20 consists in comparing the value of the first incrementation variable np with a ceiling value S1p greater than the value Sp constituting the incrementation ceiling for the variable np for the first iterative loop.

By way of example, the respective values Sp and S1p may be of the order of 5 and 10, respectively.

The aim of this comparison is to end the second iterative loop when the variable np becomes greater than the ceiling value S1p.

In the opposite case (np<S1p), step 22 following this comparison consists in incrementing the second incrementation variable nt by one unit, and this step 22 is itself followed, until the variable nt becomes greater than a predetermined ceiling value St, which event is established in a step 23 of comparing between the value of this variable nt and said ceiling value St, by the commencement of a new revolution of the second iterative loop, beginning upstream of step 19 of measuring the temperature in the exhaust line 5.

This looping, capped by the value St, has the role of initiating a delay of a duration suitable for allowing the slowness of the evolution of the measured temperatures T° to be taken into consideration.

By way of example, the ceiling value St, which determines the duration of this delay, is designed such that this delay duration is of the order of 1 to 2 min.

At the end of this delay that takes effect when, in step 23, the value of the variable nt is established as being greater than the ceiling value St, the following step consists in commencing a new revolution of the first iterative loop, beginning downstream of initial step 12 of resetting the counter of the variable np, but upstream of step 13 of initializing the second variable nt.

At the end of this second iterative loop, following step 24 consists in ordering momentary stoppage of the electric engine Me:
- either following step 20 when the conclusion of this step consists in establishing a lack of correspondence between the measured value T° and theoretical value Tth of the temperatures,
- or following step 21, when it is established in this step that the value of the incrementation variable np is greater than the ceiling value S1p, reflecting the persistence of contradictory conclusions resulting from the two procedures for respectively monitoring the pairs of values P, θ and the temperatures at the exhaust.

Once the electric engine. Me has stopped, following step 25 consists in triggering conventional diagnostic procedures for detecting combustion irregularities in the combustion engine Mth, in particular combustion misfires or partial combustions, at the end of which the potential anomalies detected in step 26 are memorized in step 29, and means for alerting the driver are potentially triggered.

Next, following step 27 advantageously consists in triggering a synchronization procedure performed before step 28 of restarting the electric engine Me, which is followed by looping with the initial step of resetting the counter of the variable np.

The method according to an aspect of the invention therefore makes it possible to detect potential combustion irregularities in a combustion engine coupled to an electric engine of a hybrid vehicle whose torque is distributed at all times between the two propulsion sources, and thus leads to the elimination of the risks of damaging this combustion engine and/or the catalytic converter.

The invention claimed is:

1. A method for detecting combustion irregularities in an internal combustion engine unit, called a combustion engine, coupled to an electric propulsion unit, called an electric engine, of a hybrid motor vehicle having a management unit designed to determine the respective powers to be supplied by each of said combustion engine and electric engine, and to deliver to said engines setpoint data dependent on these power distributions, said method comprising:
   intermittently measuring a pair of values that are respectively representative, at a given instant t, of the value P of the power consumed by the electric engine and of the value θ of the speed of the combustion engine,
   comparing each pair of measured values with a pair of theoretical values that are respectively representative of the values of the power Pth consumed by the electric engine and of the speed θth of the combustion engine, corresponding to the setpoint data delivered by the management unit,
   and, when there is a lack of correspondence between at least one of the measured values P, θ and the associated theoretical value Pth, θth, triggering a procedure for synchronizing the combustion engine.

2. The detection method as claimed in claim 1, wherein the management unit is programmed to manage the speed of the electric engine, wherein the comparison between the pairs of measured values P, θ and the pairs of theoretical values Pth, θth consists in checking the correspondence between the measured values P and the theoretical values Pth of the power consumed by the electric engine.

3. The detection method as claimed in claim 1, wherein the management unit is programmed to manage the torque of the electric engine, wherein the comparison between the pairs of measured values P, θ and the pairs of theoretical values Pth, θth consists in checking the correspondence between the measured values κ and the theoretical values θth of the speed of the combustion engine.

4. The detection method as claimed in claim 1 wherein, when a determined number Sp, where Sp>1, of successive measurements of the pairs of measured values P, θ are subject to a lack of correspondence with the associated pairs of theoretical values Pth, θth:
   momentary stoppage of the electric engine is ordered, during which stoppage a procedure for diagnosing combustion irregularities, such as combustion misfires, is triggered,
   the cycle of intermittent measurements of the pairs of values P, θ is resumed after the electric engine is restarted.

5. The detection method as claimed in claim 4, wherein the combustion engine is connected to an exhaust line equipped with a catalytic converter and with means for measuring the temperature T° at least one longitudinal area of said exhaust line, wherein, when a determined number Sp, where Sp>1, of successive measurements of the pairs of values P, θ are subject to a lack of correspondence with the associated pairs of theoretical values Pth, θth, the temperature T° is measured in at least one area of the exhaust line and the measured temperature T° is compared with a theoretical temperature Tth representative of certified normal operation of the combustion engine, and:
   when there is a difference greater than a predetermined threshold between the measured value T° and theoretical value Tth, momentary stoppage of the electric engine and triggering of a diagnostic procedure are ordered,
   when there is correspondence between the measured value T° and theoretical value Tth, the cycle of intermittent measurements of the pairs of values P, θ is resumed.

6. The detection method as claimed in claim 5, wherein, when a determined number S1p–Sp, where (S1p–Sp)≥1, of successive measurements of the temperature T° correspond to the theoretical temperature Tth, momentary stoppage of the electric engine and triggering of a diagnostic procedure are ordered.

7. The detection method as claimed in claim 5, wherein a delay of a duration suitable for allowing the evolution of the measured temperatures T° resulting from the synchronization procedure preceding said measurements to be taken into account is initiated.

8. The detection method as claimed in claim 5, wherein the temperature Tm in an area of the exhaust line situated at the output of the combustion engine is measured.

9. The detection method as claimed in that claim 5, wherein the temperature Tp in an area of the exhaust line situated downstream of the catalytic converter is measured.

10. The detection method as claimed in that claim 5, wherein:
   the temperature Tm in an area of the exhaust line situated at the output of the combustion engine is measured, on the one hand, and the temperature Tp in an area of the exhaust line situated downstream of the catalytic converter is measured, on the other hand,
   the difference in the temperatures Tp-Tm is used for the purpose of comparison with corresponding theoretical values.

11. The detection method as claimed in claim 6, wherein a delay of a duration suitable for allowing the evolution of the measured temperatures T° resulting from the synchronization procedure preceding said measurements to be taken into account is initiated.

12. The detection method as claimed in claim 6, wherein the temperature Tm in an area of the exhaust line situated at the output of the combustion engine is measured.

13. The detection method as claimed in claim 6, wherein the temperature Tp in an area of the exhaust line situated downstream of the catalytic converter is measured.

14. The detection method as claimed in claim 6, wherein:
   the temperature Tm in an area of the exhaust line situated at the output of the combustion engine is measured, on the one hand, and the temperature Tp in an area of the exhaust line situated downstream of the catalytic converter is measured, on the other hand,
   the difference in the temperatures Tp-Tm is used for the purpose of comparison with corresponding theoretical values.

15. The detection method as claimed in claim 7, wherein the temperature Tm in an area of the exhaust line situated at the output of the combustion engine is measured.

16. The detection method as claimed in claim 7, wherein the temperature Tp in an area of the exhaust line situated downstream of the catalytic converter is measured.

17. The detection method as claimed in claim 7, wherein:
   the temperature Tm in an area of the exhaust line situated at the output of the combustion engine is measured, on the one hand, and the temperature Tp in an area of the exhaust line situated downstream of the catalytic converter is measured, on the other hand,
   the difference in the temperatures Tp-Tm is used for the purpose of comparison with corresponding theoretical values.

\* \* \* \* \*

UNITED STATES PATENT AND TRADEMARK OFFICE
CERTIFICATE OF CORRECTION

PATENT NO. : 11,345,334 B2
APPLICATION NO. : 16/310193
DATED : May 31, 2022
INVENTOR(S) : Stéphane Eloy and Nathalie Raud It is certified that error appears in the above-identified patent and that said Letters Patent is hereby corrected as shown below:

In the Claims

In Column 8, Line 21, "...measured values K and the theoretical values θth of the speed of the combustion engine." should read -- measured values θ and the theoretical values θth of the speed of the combustion engine. --

Signed and Sealed this
Ninth Day of August, 2022

Katherine Kelly Vidal
*Director of the United States Patent and Trademark Office*